United States Patent

[11] 3,555,325

[72] Inventor Tokuzo Inariba
 Nishikasugai-gun, Aichi Prefecture, Japan
[21] Appl. No. 794,606
[22] Filed Jan. 28, 1969
[45] Patented Jan. 12, 1971
[73] Assignee Kabushiki Kaisha Tokai Rika Denki Seisakusho
 Nishikasugai-gun, Aichi Prefecture, Japan
[32] Priority Jan. 31, 1968
[33] Japan
[31] No. 43/5373

[54] MINIATURE ELECTRIC SYNCHRONOUS MOTOR
 2 Claims, 9 Drawing Figs.
[52] U.S. Cl. ................................................. 310/162,
 310/97, 310/154, 310/266
[51] Int. Cl. ............................................. H02k 21/00
[50] Field of Search .......................................... 310/162,
 40MM, 163, 76, 164, 77, 165, 79, 41, 83, 266, 97

[56] References Cited
 UNITED STATES PATENTS
3,448,306 6/1969 Murray......................... 310/162
3,348,083 10/1967 Inariba......................... 310/164
3,308,315 3/1967 Mahon.......................... 310/41
3,268,751 8/1966 Nebiolo......................... 310/162
3,253,169 5/1966 Haydon......................... 310/162
3,231,770 1/1966 Hyde............................ 310/162
3,059,131 10/1962 Everard......................... 310/164
2,874,809 2/1959 Poole........................... 310/162

Primary Examiner—Milton O. Hirshfield
Assistant Examiner—R. Skudy
Attorney—Otto John Munz ABSTRACT: A miniature self-starting electric synchronous motor comprises an exciting coil to provide an AC magnetic field, a permanent magnet which serves as a stator to provide a DC magnetic field and a rotor having a plurality of pole teeth actuated by the magnetism of the said magnetic fields. The pole teeth are operatively rotated within an air gap between the inner periphery of the permanent magnet and the outer periphery of the exciting coil. To assume the motor runs in a predetermined direction, a ratchet device is provided to cooperate with the rotor shaft to block rotation of the motor in the reverse direction.

INVENTOR.
TOKUZO INARIBA

INVENTOR.
TOKUZO INARIBA

INVENTOR.
TOKUZO INARIBA

MINIATURE ELECTRIC SYNCHRONOUS MOTOR

The present invention relates to a miniature electric synchronous motor.

Unlikely to the conventional self-starting electric synchronous motor using, as a rotor, permanent magnet made of a ferromagnetic material such as ferrite, the miniature electric synchronous motor comprising a permanent magnet serving as a stator has been disclosed in the specification of U.S. Pat. No. 3,348,083 of the same inventor.

A miniature electric synchronous motor of the present invention has been accomplished by improvement on that disclosed in said U.S. Pat., and comprises a rotor having smaller moment of inertia and well balanced in its mechanical and magnetic relation, resulting in providing an increased self-starting efficiency.

The present invention further relates to a ratchet device in a miniature electric synchronous motor which prevents such electric synchronous motor from being reversed on its start. An object of the present invention is to provide a ratchet device in a miniature electric synchronous motor which can regulate a reverse rotation of a rotary shaft inevitably occurring on starting of the electric synchronous motor, into a normal rotation, and provides an increased self-starting efficiency.

In the accompanying drawings showing a preferred embodiment of a miniature electric synchronous motor and a ratchet device relating to the present invention, wherein.

Figure 1:
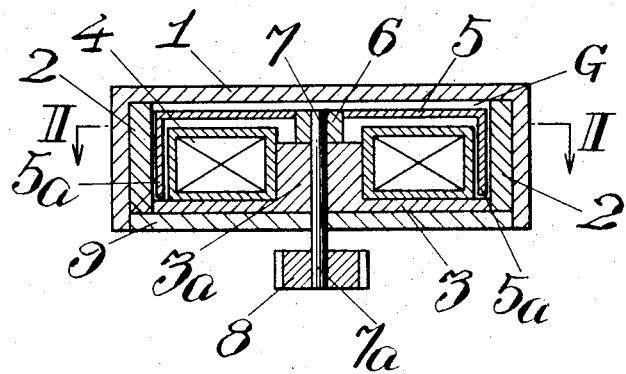
FIG. 1 is a longitudinal sectional view of a motor of the present invention.
Figure 2:
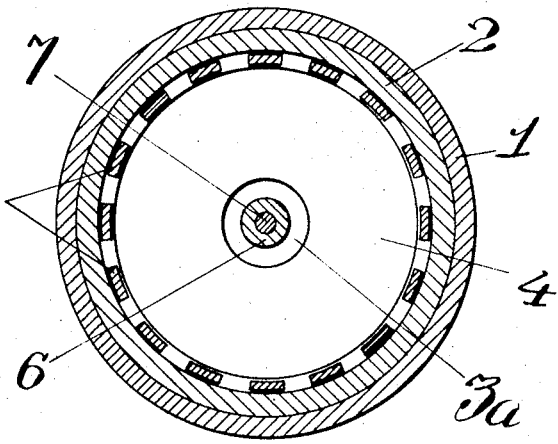
FIG. 2 is a cross-sectional view taken along the line II-II of FIG. 1.
Figure 3:
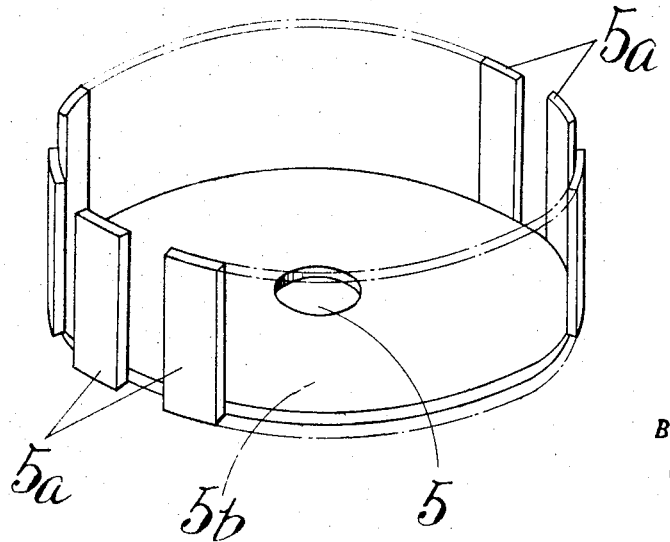
FIG. 3 is a perspective view of a rotor.
Figure 4:
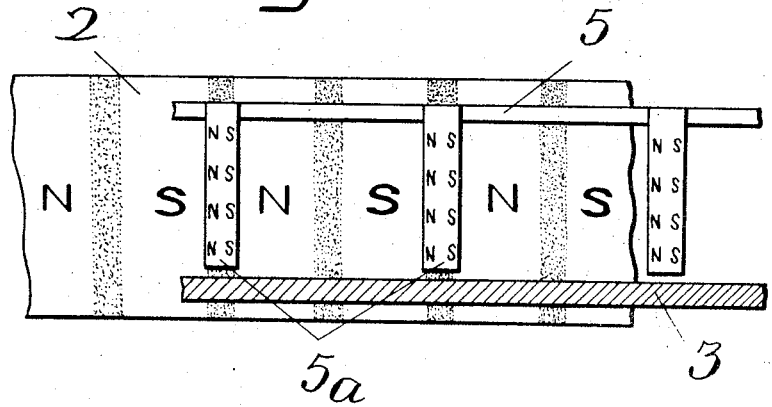
FIG. 4 is an explanatory development view showing distribution of alternating magnetic flux around pole teeth of a rotor.

Referring to the drawings, numeral 1 is a motor casing, which is made of a soft magnetic material and serves as a part of alternating magnetic circuit. Around an inner periphery of the motor casing is fixed a cylindrical permanent magnet 2, which has 16 magnetic poles alternating in polarity, with eight north poles alternating with eight south poles. These magnetic poles each are spaced at an equally angular distance around the inner periphery of the cylindrical permanent magnet 2 and face on an outer periphery of a below mentioned exciting coil or winding.

Fixedly mounted to said cylindrical permanent magnet 2 is a base or mount plate 3, which has a central projection 3a serving as a bearing. Around the projection 3a of the base or mount plate 3, an annular exciting coil or winding 4 is insertedly fixed in a manner of forming an annular gap G between an outer periphery thereof and the inner periphery of the cylindrical permanent magnet 2.

Numeral 5 is a rotor, which has eight pole teeth 5a bent to extend perpendicularly to the diametric plane of the rotor 6 and arranged each at an equally angular space around its periphery, and is fixed, through a plastic or light metalic small boss 6 fixed to a central opening 5b thereof, to a rotor shaft 7 made of nonmagnetic material inserted through the projection 3a of said base or mount plate 3. An output pinion or gear 8 may be fixed to an extension 7a of the rotor shaft 7. Numeral 9 is a cover plate of plastics.

Operation is as follows.

When the alternating current is applied to the exciting coil or winding 4 which has been deenergized, in other words, with respective pole teeth 5a excited to the north and south poles by the poles of the permanent magnet 2, the alternating magnetic flux generated by said exciting coil or winding 4 effects on the rotor 5, so that all of pole teeth 5a have the same instantaneous polarity. The alternating magnetic flux path extends from the exciting coil or winding 4 to the rotor 5, and into the base or mount plate 3, via pole teeth 5a, and back into the exciting coil or winding 4.

The DC magnetic flux path extends from one peripheral pole of the permanent magnet 2 into pole teeth 5a, and into other peripheral pole having polarity opposite to said peripheral pole and adjacent thereto. This equal and opposite magnetic force exerted on each of pole teeth 5a influences on a respective pole tooth 5a at the moment when the magnetic flux, during each cycle of AC energization, passes through the zero value. Consequently, when the exciting coil or winding 4 is in the zero value or deenergized, respective pole teeth 5a of the rotor 5 locate between each pair of adjacent and opposite poles on the periphery of the permanent magnet 2. Each pair of two poles has respectively an opposite polarity. This is due to the fact that two poles of each pair of poles, one north pole and other south pole, on the periphery of the permanent magnet 2 exert an equal and opposite magnetic force on each of pole teeth 5a, when the exciting coil or winding 4 is deenergized. When the alternating potential is applied to the exciting coil or winding 4, all of pole teeth 5a are magnetized to an instantaneous polarity alternating between the south and north pole, in synchronism with the frequency of the AC potential.

That is, when the alternating potential is applied to the exciting coil or winding 4, all pole teeth 5a have an instantaneous polarity in such that for example, each pole tooth 5a is attracted by the north pole of each pair of associated permanent magnet 2, and repelled by the south pole of each pair of associated permanent magnet 2. And, in the next half cycle of the alternating current, the instantaneous polarity of all pole teeth 5a is reversed. Thus, the rotor 5 is rotated in synchronizing with the frequency of the AC potential source.

Figure 5:
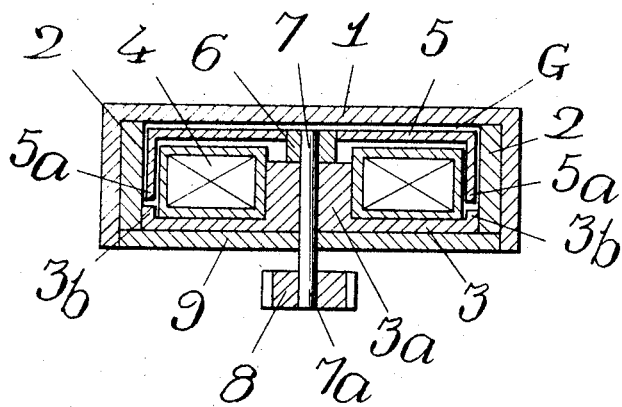
FIG. 5 is a longitudinal sectional view of a motor of another embodiment.
Figure 6:
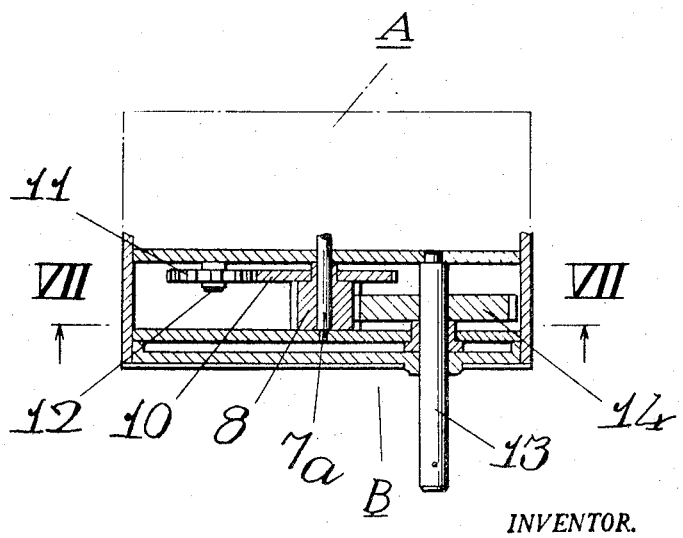
FIG. 6 is a longitudinal sectional view showing an embodiment of a ratchet device in an electric synchronous motor, relating to the present invention.
Figure 7:
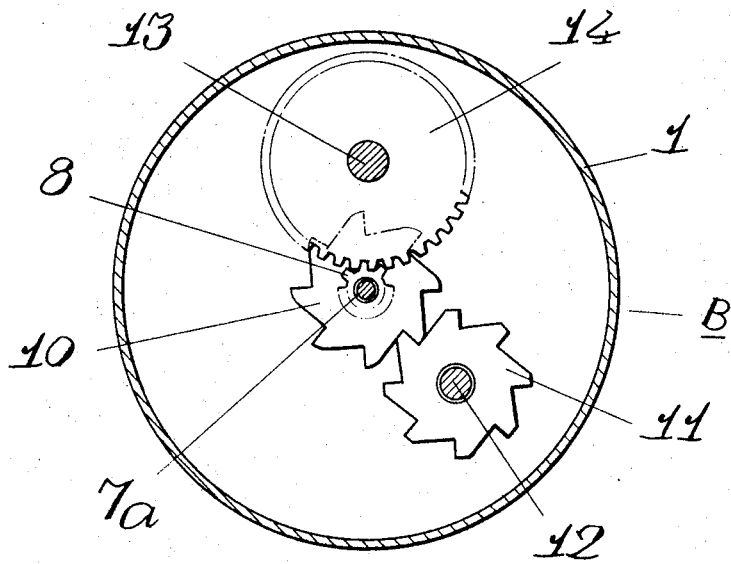
FIG. 7 is a longitudinal sectional view taken along the line VII-VII of FIG. 6.

FIG. 5 shows another embodiment, in which a salient pole ring 3b is provided circumferentially of said base or mount plate 3 and serves to increase density of magnetic flux by concentrating the magnetic flux leaking from the pole teeth 5a into a gap portion formed between the pole teeth 5a and the salient pole ring, and hence, torque and efficiency is remarkably improved. This results in increased efficiency of the annular alternating magnetic field and increase in interlinkage thereof with the DC magnetic field of the permanent magnet.

If each of the pole teeth 5a of the rotor 5 is tapered toward its free end into a sharp-pointed end (not shown), magnetic reluctance will increase in a direction of said sharp-pointed end, and the interlinking line of magnetic force will occur not only in the sharp-pointed end portions but also in the base portions of the pole teeth. Consequently, since the line of magnetic force extends not only from parts of pole teeth adjacent to their sharp-pointed ends, but also from entire edge surfaces of the pole teeth, the alternating magnetic flux is changed into the interlinking magnetic flux distributed evenly over the overall cylindrical surface of the permanent magnet. Such even distribution of the interlinking magnetic flux permits the alternating magnetic flux to interlink effectively and at high efficiency with the DC magnetic flux, so far as magnetic pole pieces have a sharp characteristic of magnetic saturation, and an appropriate thickness, configuration and size.

Referring to FIGS. 6 through 9, a ratchet device B in an miniature electric synchronous motor of the type will be disclosed hereinunder.

Fixedly mounted to a rotary shaft 7a of an electric motor A having a permanent magnet fixed around a motor casing and serving as a stator, and rotatable magnetic pole pieces having as a rotor is a saw tooth wheel 10. The number of teeth on the saw tooth wheel 10 are an even multiple of the number of the pole teeth of the rotor. Right angular tooth surfaces 10a are directed to a normal direction of rotation of the rotor. To one end of the rotary shaft 7a, a pinion 8 is fixed. Numeral 11 is a ratchet wheel, which is idly fitted to a shaft 12 parallel with the rotary shaft and meshed with said saw tooth wheel 10. The rachet wheel 11 has teeth of the same number as that of the saw tooth wheel 10. Each tooth of the ratchet wheel 11 has a right angular tooth surface 11a which confronts against that 10a of said saw tooth wheel 10, and substantially straight circumferential edge 11b which will be contacted and engaged with an inclined surface 10b of the wheel 10. 13 is an output shaft projecting outwardly of the motor casing 1, to which a toothed wheel 14 is fixed to mesh with said pinion 8.

Figure 8:
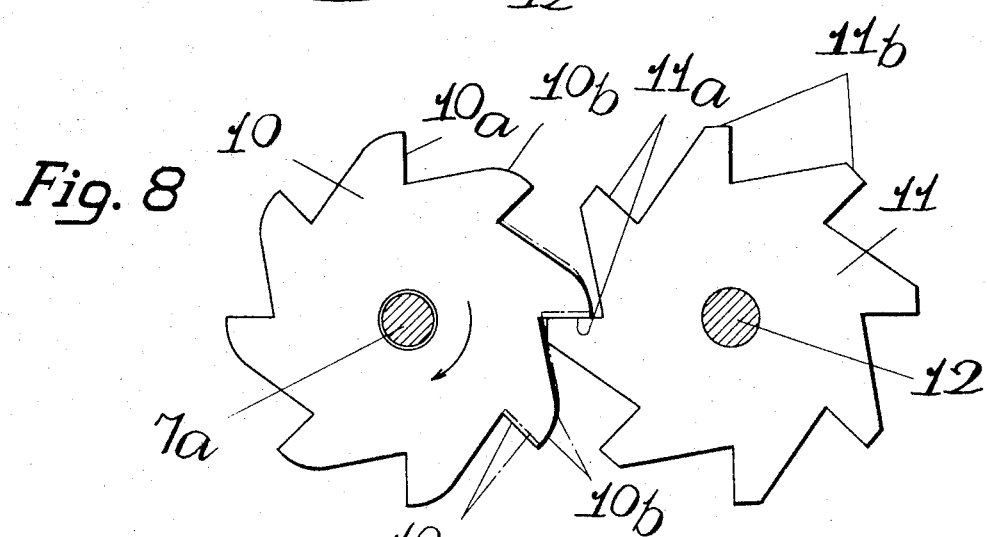
FIGS. 8 and 9 are explanatory enlarged views of ratchet wheels.
Figure 9:
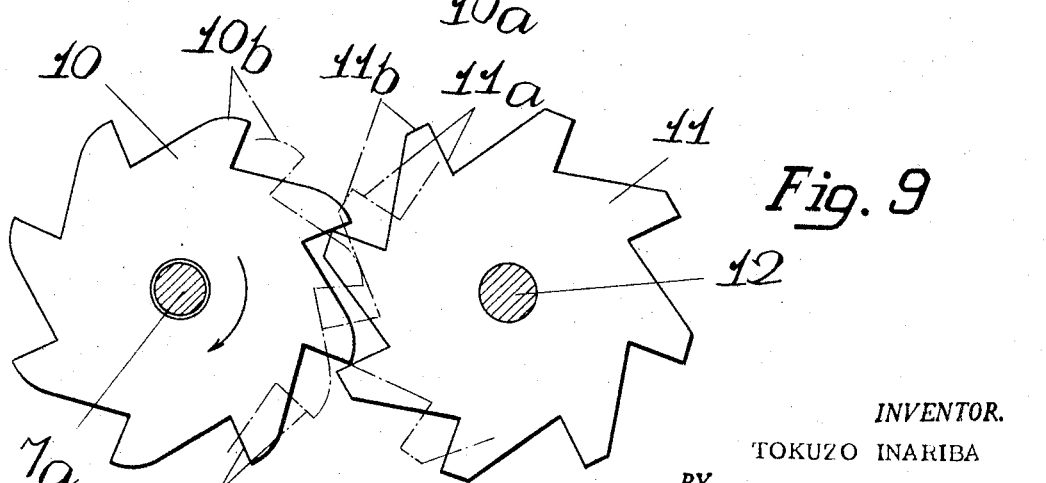

In the miniature electric synchronous motor of this embodiment, when the exciting coil or winding is deenergized, each of pole teeth of the rotor locates between the north and south poles of permanent magnet, in other words, in a position of the minimum value in magnetic reluctance, and the saw tooth wheel 10 and ratchet wheel 11 are placed in the positional relationship as shown in FIGS. 8 or 9.

When the AC is applied to the exciting coil or winding 4, the pole teeth 5a of rotor 5 is excited cyclically to the north or south pole, hence the rotor 5 generates a primal torque in a desired direction, unless the pawl or ratchet wheel 11 is provided, due to repulsion and attraction occuring between each pole tooth and the north or south pole of the permanent magnet 2. Thereafter, the primal torque in a desired direction of the rotor 5 is shifted, due to cyclical conversion of polarity of the rotor and inertia force caused by the AC cycle, to synchronous rotation, which continues on. In the above-described case, shift from the primal torque to the normal rotation requires comparatively more time, because the primal torque acts in a desired direction, which results in low self-starting efficiency.

In the ratchet device B of the present invention, when the rotary shaft 7a begins to rotate in its normal direction of rotation, that is, to a clockwise direction, as shown in FIG. 8, the saw tooth wheel 10, after being slightly rotated as shown with the one-dotted line in FIG. 8, becomes butted at each inclined surface 10b against respective right angular tooth surface 11b of the ratchet wheel 11, so that said saw tooth wheel 10 is restricted in its reversion into its normal rotation due to subsequent conversion in polarity of the rotor 5. When the rotary shaft 7a starts in the reverse rotation, that is, in an anticlockwise rotation, from the stationary position in FIG. 9, the saw tooth wheel 10, after a reverse rotation during a time corresponding to one pole section of the permanent magnet, becomes butted at each inclined surface 10b against each straight circumferential edge 11b of the ratchet wheel 11, hence said saw tooth wheel 10 is restricted in its reverse rotation to shift to its normal rotation due to subsequent conversion in polarity of the rotor 5. The saw tooth wheel 10, during it normal rotation, is maintained in mesh with the ratchet wheel 11 to rotate it in cooperation.

The electric synchronous motor A relates not only to the above exemplified electric synchronous motor, but also to the conventional electric synchronous motor of the type having a permanent magnet or an exciting coil as a rotary element, and said permanent magnet having the north or south poles of the equal number to or multiple of the integral number of that of a rotor fixed to the exciting coil. In either case, the number of teeth of a saw tooth wheel is essentially required to be equal to or a multiple of integral number of pole teeth of the rotor.

I claim:

1. A miniature synchronous electric motor comprising, in combination;

a casing having a cylindrical housing;

a bearing carried by said casing;

a shaft rotatable in said bearing and having an inner end within said casing, and an outer end;

a stationary annular permanent magnet mounted nonrotatable within said cylindrical housing and concentric with said shaft, said permanent magnet being magnetized radially to provide north and south poles alternating therearound at equal angular spacings;

an annular exciting winding concentric with said shaft and arranged for connection to a source of AC potential;

a nonmagnetic boss member secured to the inner end of said shaft to rotate with the latter;

a magnetic material rotor secured to said nonmagnetic boss member, said rotor including a circular body portion lying in a radial plane through said shaft and a plurality of pole teeth projecting from the periphery of said body portion at uniform angular spacings therearound;

the number of said poles being an even multiple of the number of said pole teeth;

said winding, when energized, producing an alternating magnetic field in an alternating magnetic flux path including said winding, said rotor and an air gap formed between the said permanent magnet and the said exciting winding;

said pole teeth operatively rotated within said air gap and extending in overlapping spaced relation to said permanent magnet poles to provide direct magnetic flux paths each including a respective north pole, a respective pole tooth, and a respective south pole angularly adjacent the respective north pole;

said alternating and direct magnetic flux paths interlinking in said air gap; and a ratchet means operatively connected to said outer end of said shaft for permitting said rotor to rotate only in one direction.

2. A miniature synchronous electric motor as claimed in claim 1, in which said ratchet means includes a first saw tooth wheel fixedly mounted on said shaft;

a second shaft positioned parallel to said first mentioned shaft;

a second saw tooth wheel idly mounted on said second shaft and intermeshed with said first saw tooth wheel;

the number of saw teeth on each of said first and second saw tooth wheels being on even multiple of the number of said pole teeth;

a pinion gear fixedly mounted on said first mentioned shaft;

an output shaft positioned parallel to said other two shafts; and a toothed wheel rotatably mounted on said output shaft and intermeshed with said pinion gear.